United States Patent
Ang et al.

(10) Patent No.: US 7,421,575 B2
(45) Date of Patent: Sep. 2, 2008

(54) CONFIGURING A PHYSICAL PLATFORM IN A RECONFIGURABLE DATA CENTER

(75) Inventors: Boon Seong Ang, Sunnyvale, CA (US); Michael Schlansker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 10/892,272

(22) Filed: Jul. 16, 2004

(65) Prior Publication Data

US 2006/0015712 A1   Jan. 19, 2006

(51) Int. Cl.
G06F 9/50 (2006.01)
(52) U.S. Cl. .............. 713/100; 713/1; 718/104
(58) Field of Classification Search ........ 713/1, 713/100; 718/104
See application file for complete search history.

(56) References Cited

U.S. PATENT DOCUMENTS

| | | | |
|---|---|---|---|
| 5,321,826 A | 6/1994 | Ushiro | |
| 5,381,534 A | 1/1995 | Shi | |
| 5,394,522 A | 2/1995 | Sanchez-Frank et al. | |
| 5,479,599 A * | 12/1995 | Rockwell et al. | 715/837 |
| 5,740,396 A | 4/1998 | Mason | |
| 6,138,150 A | 10/2000 | Nichols et al. | |
| 6,353,884 B1 | 3/2002 | Schmitz et al. | |
| 6,463,530 B1 | 10/2002 | Sposato | |
| 6,578,141 B2 * | 6/2003 | Kelley et al. | 713/1 |
| 6,609,176 B1 | 8/2003 | Mizuno | |
| 6,625,638 B1 * | 9/2003 | Kubala et al. | 718/105 |
| 6,816,963 B1 | 11/2004 | Krithivas et al. | |
| 6,889,172 B2 | 5/2005 | Sierer et al. | |
| 6,982,570 B1 | 1/2006 | Ang et al. | |
| 7,013,449 B2 | 3/2006 | Schlansker et al. | |
| 7,036,006 B2 * | 4/2006 | Bandhole et al. | 713/1 |
| 7,065,637 B1 | 6/2006 | Nanja | |
| 7,082,521 B1 * | 7/2006 | Nanja | 713/1 |
| 7,093,113 B2 | 8/2006 | Lakshman | |
| 7,146,480 B2 | 12/2006 | Schlansker et al. | |
| 2002/0087611 A1 * | 7/2002 | Tanaka et al. | 709/1 |
| 2003/0036871 A1 | 2/2003 | Fuller et al. | |
| 2003/0036873 A1 | 2/2003 | Sierer et al. | |
| 2003/0055746 A1 | 3/2003 | Bishop | |
| 2003/0097422 A1 | 5/2003 | Richards et al. | |
| 2005/0172292 A1 * | 8/2005 | Yamada et al. | 718/105 |
| 2006/0015589 A1 | 1/2006 | Ang et al. | |
| 2006/0015866 A1 | 1/2006 | Ang et al. | |

OTHER PUBLICATIONS

Goldsack, P. et al., "Smartfrog: Configuration and Automatic Ignition of Distributed Applications", May 29, 2003, HP Labs, Bristol, UK.
Hewlett-Packard, "HP ProLiant Essentials Rapid Deployment Pack Planning Guide" Release 1.0, Oct. 2003 (First Edition).
Lenoski, D. et al., "The Directory-Based Cache Coherence Protocol for the DASH Multiprocessor", 1990 IEEE.

(Continued)

Primary Examiner—Thuan Du

(57) ABSTRACT

A description of components in a reconfigurable data center is received. A set of components from the description is selected for a physical platform based on a logical platform specification.

33 Claims, 6 Drawing Sheets

OTHER PUBLICATIONS

Microsoft Windows Server 2003, "Automated Deployment Services Technical Overview", Aug. 2003.

Ngai, T. et al., "An SRAM-Programmable Field-Configurable Memory", Dept of Electrical and Computer Engineering, University of Toronto.

Wilton, S.J.E. et al., "Architecture of Centralized Field-Configurable Memory", Dept of Electrical and Computer Engineering, University of Toronto.

Wilton, S.J.E. et al., "The Memory/Logic Interface in FPGAs with Large Embedded Memory Arrays", University of Toronto.

* cited by examiner

CONFIGURING A PHYSICAL PLATFORM IN A RECONFIGURABLE DATA CENTER

BACKGROUND

Highly scalable computer systems of the future will be based on large ensembles of commodity components, such as processors, disk drives, memory, etc. As increasingly inexpensive, high-performance systems scale to even larger sizes, the task of managing hardware and software components and maintaining reliable and efficient computation with those components becomes increasingly complex and costly. For example, systems must be redeployed to accommodate evolving user demands without lots of manual rework. Typically physical reconfiguration of the components for redeploying systems to accommodate evolving user demands is performed by manually moving components or manually programming switches connecting components, such as blades and disk drives. For large-scale systems, the manual, reconfiguration becomes unmanageable, time consuming, and costly.

Some reconfigurable systems exist that allow for reconfiguration of hardware while minimizing manual labor. FPGAs (Field Programmable Gate Arrays) are an example of a reconfigurable device. FPGAs offer the ability to configure arbitrary logic and a small amount of flip-flop memory into different hardware designs through use of a hardware description language. While FPGAs enable a certain degree of configurability, their flexibility is limited to the chip level instead of the system level. Thus, for large-scale systems, where system components must be allocated to meet evolving user demands, FPGAs offer limited, system-level, physical customization.

Utiliity data centers offer some system-level customization. For example, components, such as servers and disk drives may be connected via a network, and disk drives may be allocated to certain servers to meet varying user demands. However, allocating disk drives to different servers requires a system administrator to program the network to provide the interconnections between the allocated servers and disk drives. Also, the physical reconfiguration of components may be limited to servers and disk drives.

SUMMARY

A description of components in a reconfigurable data center is received. A set of components from the description is selected for a physical platform based on a logical platform specification.

BRIEF DESCRIPTION OF THE DRAWINGS

The embodiments are illustrated by way of example and without limitation in the accompanying figures in which like numeral references refer to like elements, and wherein.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the description of the embodiments.

According to an embodiment, a reconfigurable data center comprises a collection of components, including processors, memories, disks, I/O devices, other devices, and an interconnection network that is programmable and facilitates flexible communication among the components. The components may be configured and reconfigured to meet varying user requirements. For example, a reconfiguration system may pair a processor with a suitable amount of memory, such as an appropriate amount of memory to support an application or multiple applications, to form a computer system, referred to as a physical platform. In this example, the paired processor and memory work together to meet the needs of the applications that the processor runs. Physical memory not needed for this physical platform is assigned to another physical platform. These physical platforms may then be reconfigured, for example, to meet new user requirements. A physical platform may also include multi-processor systems with shared memory, and physical platforms may include other types of components such as disks, I/O devices, cooling resources, network switches, etc.

In the reconfigurable data center, reconfiguration is done programmatically, avoiding physical movement of hardware. This provides several benefits, including the ability to quickly configure the components to accommodate changing user requirements without manually moving system boards or re-cabling. Programmatic reconfiguration uses user requirements, referred to as logical platform specifications, and data center specifications to select the components used for physical platforms during configuration. Also, a flexible interconnection network is provided that supports reconfiguring the components into different physical platforms. The interconnection network supports varying types of communication traffic including memory accesses, disk accesses, and other network traffic, and switches in the interconnection network may be programmed to accommodate reconfiguration of physical platforms.

Figure 1:
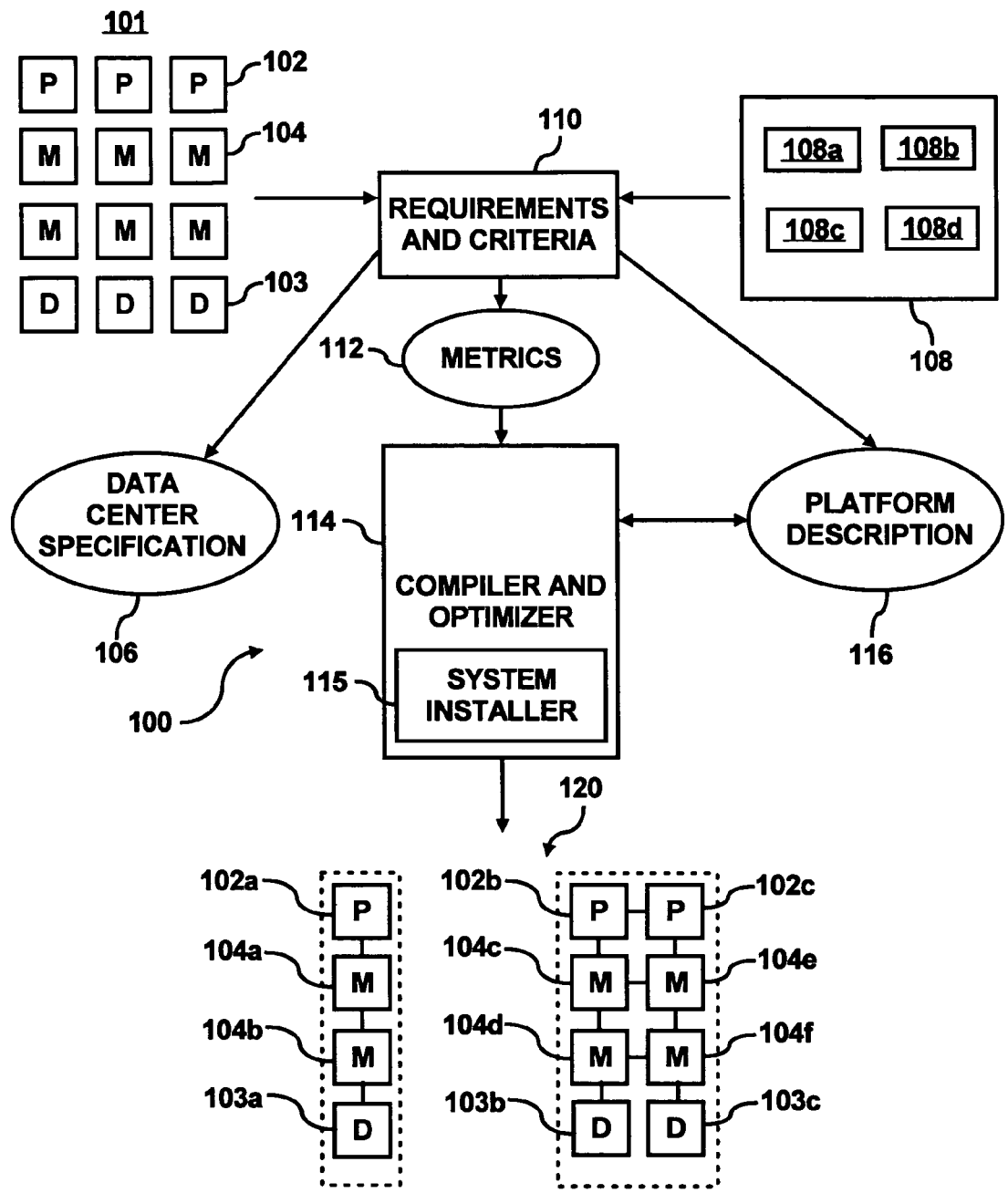
FIG. 1 shows a schematic diagram of a system for configuring a reconfigurable data center, according to an embodiment.
Figure 2:
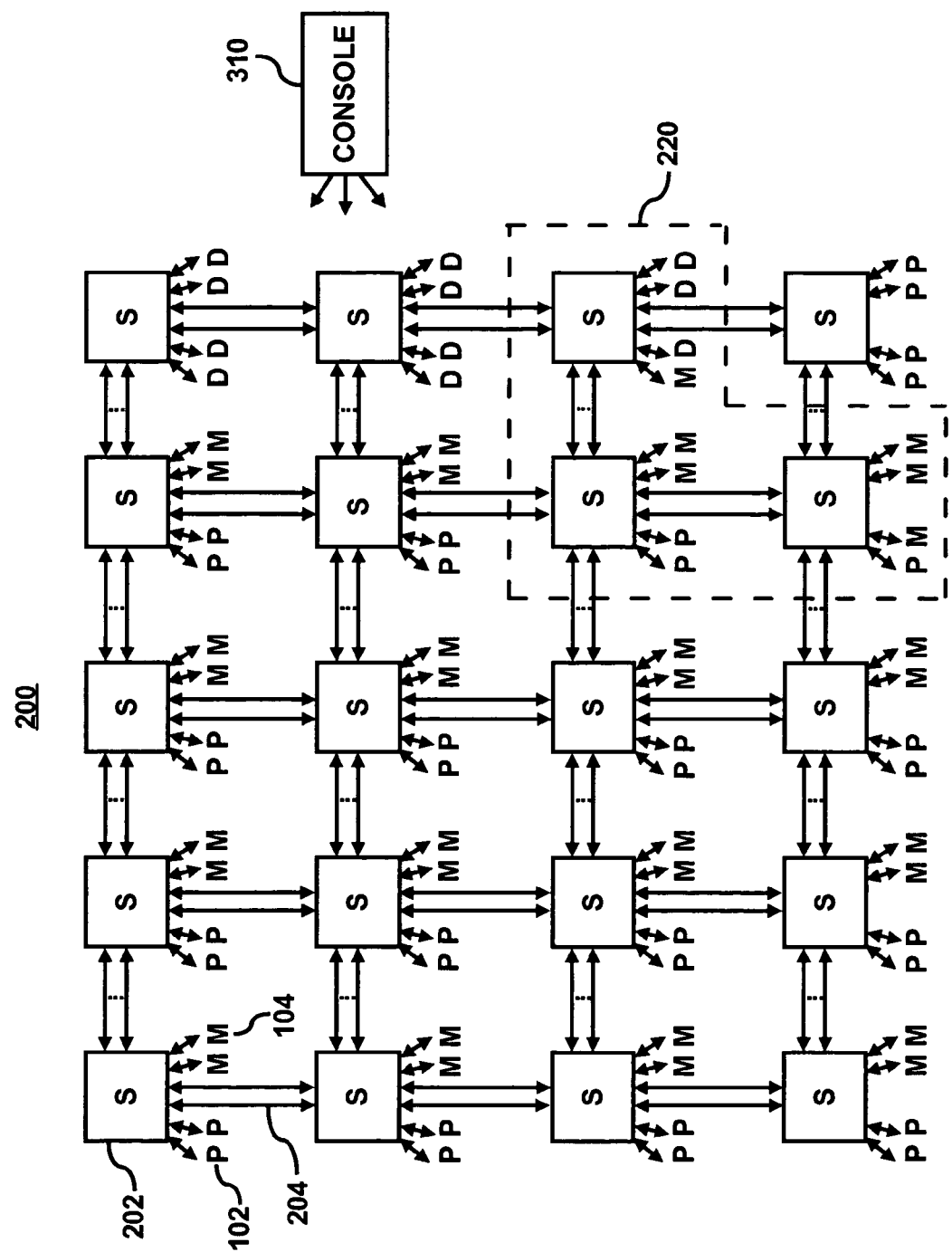
FIG. 2 shows a schematic diagram of a reconfigurable data center, according to an embodiment.

FIG. 1 illustrates a configuration system 100 for selecting components to be used in physical platform in a reconfigurable data center and deploying the components as the physical platform. The system 100 of FIG. 1 has access to a collection of components 101, including processors 102, memory modules 104, disk drives 103, and other components that may be used in the reconfigurable data center. The reconfigurable data center, including the components 101 and interconnections, is shown in FIG. 2 and described below. In FIG. 1, the components 101 are described in the data center specification 106, which is input to the system 100 along with one or more logical platform specifications 108 that together make up the requirements and criteria 110 for configuring a set of the components 101 into a physical platform 120. The system 100 includes a compiler and optimizer 114 which may include hardware or software or a combination of both hardware and software.

The physical platform 120 includes a configured system within the reconfigurable data center that accommodates the requirements of a user. The physical platform 120 includes both components and interconnections. The interconnections include switches and wiring which interconnect components within the reconfigurable data center.

A list of metrics 112 is also input into the system 100 to further optimize the physical platform 120. The list of metrics may be related to computer system performance, such as processing speed, memory and disk speed (e.g., access times), power, etc. These metrics are used to test simulated physical platforms before being deployed.

The data center specification 106 includes a description of the components 101. The data center specification 106 may be used to describe all the components within the reconfigurable data center. The description may include a list of the components 101 in the data center specification 106, such as a description of the processors, memory modules, disks, I/O devices, and configurable switches in an interconnection network for the reconfigurable data center. An interconnection network as well as addressing in the reconfigurable data center and programming components in the reconfigurable data center to accommodate reconfiguration are described in further detail in U.S. patent application Ser. No. 10/892,305, entitled "A Reconfigurable Memory System", and U.S. patent application Ser. No. 10/892,570, entitled "A System Installer for a Reconfigurable Data Center" both assigned to the Assignee of the present invention and incorporated by reference in their entirety. The data center specification 106 may also include other information about the components 101, such as distance between components and/or load.

Instead of including a list of all the components 101 in the data center specification 106, in another embodiment the data center specification 106 describes only the components 101 that are available to be deployed as a physical platform. For example, some components may be committed to prior uses and thus are unavailable, or some components may be malfunctioning and thus are unavailable. A data center specification that only includes available components may reduce testing and configuring process times when configuring a physical platform.

An example of a description in the physical data center specification 106 may include a description of processor type and processor speed. Memory and disks may also be characterized by size and speed (e.g. rotational speed and seek time). Other components described in the data center specification 106 may include I/O or graphics display hardware. The description of the components may include a number of ports that are used to connect the components into a larger system in order to support communication between the components.

Within the reconfigurable data center, the components 101 are connected with a network of links and switch units that provide communication, i.e., components in an interconnection network. Connected and coupled as used herein refers to components or devices being in electrical communication. The electrical communication may be via one or more other components or may simply be between the components sending and receiving information. The physical data center specification 106 may also include a description of the number and type of switches and switch ports that can be used for a physical platform. Network connections may be described in the physical data center specification 106 through a description of links. A link may connect a component to a switch object, a switch to a switch, or a component to another component. Non-point-to-point physical networks, such as broadcast networks that connect a single output port to many input ports, may also be described in the physical data center specification 106 if a non-point-to-point physical network is provided in the reconfigurable data center.

Software objects or data structures may be used to provide descriptions of the components 101 in the data center specification 106 and may be used to provide descriptions for the logical platform specifications 108. The software objects or data structures are input into the compiler and optimizer 114 for configuring the physical platform 120. In this example, the physical platform 120 consists of two distinct computer systems wherein one system includes a NUMA (non-uniform memory access) shared memory multiprocessor system having two processors that share four memories and two disks and the other system is a single processor system with two memories and one disk.

Each of the logical platform specifications 108 includes a list of component requirements for a physical platform. These component requirements may be provided by a user. The logical platform specifications 108 shown in FIG. 1 include logical platform specifications 108a-d by way of example, and multiple logical platform specifications may be input into the system 100 in a group or one at a time. The logical platform specification 108a, for example, includes platform specifications, memory specifications, software specifications (e.g., operating system, BIOS specifications, file system specifications, and other application-related specifications), virtual memory specifications, network specifications, I/O specifications, etc. Other specifications may be included in order to describe components of a computer system, i.e., the physical platform providing the functionality meeting the user requirements. These specifications provide a high-level description of the features of the physical platform to be configured.

The information in a logical platform specification may include but is not limited to one or more of processor type and speed, memory capacity, speed and type, I/O specifications such as type and speed, disk size, type, and speed, etc. A network specification may also be included that describes the manner in which the various components are interconnected. The network specification describes a network architecture that interconnects multiple computer systems. The network specification may identify whether certain processors are in communication with each other or other network-related features. For example, the network specification may identify whether the physical platform for the logical platform specification 108a is to be connected to a physical platform for the logical platform specification 108b.

An example of a processor specification in a logical platform specification may include a NUMA multi-processor. A NUMA multi-processor is a multiple processor computer system consisting of multiple processors that can be used in parallel to enhance performance, and that access a common shared memory. NUMA multi-processors have non-uniform memory access performance such that memory locations that are closer to a processor may be accessed more quickly from that processor than locations that are far from that processor. NUMA shared-memory processors often run a single operating system to manage the hardware resources. Another example of a processor specification may include a computational cluster of processors that communicate through message passing such as the MPI message-passing library. These processors may not share memory and typically run an operating system on each processor to manage that processor's resources.

A memory specification in a logical platform specification may include a description of a collection of memory objects that constitute a main memory for a NUMA shared-memory system. Memory objects may, for example, be pages or quantities of memory of known size. A memory specification may include a memory access requirement specification that indicates, for each processor and for each memory object, the number of accesses from that processor to that object that are expected within a given unit of time (e.g. one second). This information is helpful in placing processors and memory objects to reduce lost performance due to memory accesses. Memory objects that are frequently accessed by a processor can be placed close to that processor.

A logical platform specification may also include a file system specification and/or a disk specification that describes a number of disk memory objects. Disk memory objects might be file systems of known sizes that are formatted according to a known specification. A disk memory specification may also include a disk access requirement that indicates, for each processor and for each disk object, the number of accesses that are expected within a given unit of time (e.g. one second) from a processor to a disk object. Other disk specifications may include the average length of a data block that is transferred. Similarly to memory, physically close processors and disks that frequently communicate can be placed close together.

A logical platform specification may also include software specifications, which may designate the operating system, BIOS information such as describing available hardware for each multiprocessor when it boots (e.g., available memory, disk space, and I/O devices), library software and application software to be loaded, etc. The software specification may also include service information which is related to a scalable ensemble of programs needed to meet user requirements. For example, individual programs may be connected to appropriate input data sets, output data sets, and temporary data sets, and the service information describes how the output of one application serves as the input to another.

The software specifications may also include application signatures. Application signatures are descriptions of the computer resource demands made by all applications to be executed by a physical platform. This information may be used to determine the workload to be placed on a processor and other components in a physical platform and can further be used to allocate processors to a physical platform.

A specific example of a description in, for example, the logical platform specification 108a may include a four-way shared memory multi-processor (SMP) implemented with four 1.5 GHz PA-RISC processors, that provide 4 gigabytes of shared physical memory, and two 200 GB disks. This 4-way SMP runs the Linux operation system. The logical platform specification 108a is then used by a compiler and optimizer 114 to select the actual processors, memories and disks from available components to implement the physical platform 120 providing the needed functionality.

The compiler and optimizer 114 selects components from the data center specification 106 and generates the platform description 116. The platform description 116 is a description of the components to be used in a physical platform, i.e., the physical platform 120. The platform description 116 is used by the compiler and optimizer 114 to deploy the physical platform 120. In particular, the compiler and optimizer 114 may include a system installer 115 for deploying the physical configuration 120. The system installer 115 may also be a separate component from the compiler and optimizer 114 but connected to the compiler and optimizer 114. Deploying may include populating tables (e.g., addressing tables) in hardware components and the interconnection network (e.g., routing tables), which is described below and is further described in U.S. patent application Ser. No. 10/892,570, incoporated by reference in its entirety.

The compiler and optimizer 114 generates the platform description 116 as described above. The physical platform 116 differs from the logical platform description 108 in that the platform description 116 includes the selected components from the data center specification 106. For example, the compiler and optimizer may generate multiple platform descriptions, but ultimately select one based on simulations and testing using, for example the metrics 112 and the requirements and criteria 110, to identify the most optimum physical platform. The list of metrics may be related to computer system performance, such as processing speed, memory and disk speed (e.g., access times), power, etc. These metrics are used to test simulated physical platforms before being deployed.

The system 100 then deploys a configuration, shown as the physical platform 120. In the example shown in FIG. 1, the system 100 configured one processor 102a to access two memory modules 104a and 104b and configured two processors 102b and 102c, now a processor group, to operate as a multiprocessor system and access four memory modules 104c, 104d, 104e and 104f. These configurations may be the deployed physical platform for one or more of the logical specifications 108. Thus, the system 100 provides for reconfiguring hardware components based on input specifications, which allows the configurations to be optimized for multiple applications among other things.

As part of the configuration process, the compiler and optimizer 114 selects components from the components 101 to be configured as part of the physical platform 120. The selection process considers a variety of factors such as whether components satisfy the logical platform specifications. For example, the logical platform specification 108a includes hardware specifications and software specifications. These specifications are parsed into logical units. For example, processor specifications are broken down into logical processors, including the user requirements for one or more processors in the physical platform. The logical processors are mapped onto physical processors, such as one or more of the processors 102 shown in FIG. 1. Logical memory units are mapped to one or more of the memory modules 104 and logical disks are mapped to one or more of the disks 103 based on whether the physical hardware meets the user requirements of the logical units. Communication specifications are also mapped to communication wires and switches.

Other factors that affect the selection of components for the physical platform include physical location of the components, which is related to communication latency between components, and load. The selection process is further described with respect to FIGS. 4-6.

Referring now to FIG. 2, there is shown a schematic diagram of a reconfigurable data center 200 including the components 101 from FIG. 1. The components 101 shown in FIG. 2 include network switches 202 (not shown), processors 102, memory 104, and disks 103. Some of the processors 102 may be used in a NUMA architecture. The network of switches 202 are interconnected with links 204 (not shown), for example, including copper wire or optical fiber to support communication between the switches 202 and the other components 101. The switches 202 and the links 204 are part of an interconnection network facilitating communication between the components in a physical platform. The switches 202 are also connected to the processors 102, memory 104, and disks 103. The switches 202 can be programmed to facilitate communication among particular components. The links 204 may include bi-directional data communication links forming part of an interconnection network connecting components in the reconfigurable data center 200. The interconnection network is also configurable to accommodate new configurations of the components 101. A bi-directional data communication link is connected to a port that provides mirroring in-bound and out-bound sub-ports that connect, through the bi-directional link, to corresponding out-bound and in-bound sub-ports on another port. An interconnection network based on unidirectional links may also be employed to construct the reconfigurable data center 200.

The compiler and optimizer 114 be maybe a part of or connected to the console 310 shown in FIG. 2. As described above, the compiler and optimizer 114 receives the logical platform specifications 108 as input, along with the data center specification 106 shown in FIG. 1, to configure the physical platform 120 from the components 101 shown in FIGS. 1 and 2. The physical platform 120 shown in FIG. us also shown in FIG. 2 as the components in the dashed box 220. The components in the dashed box 220 were selected by the compiler and optimizer 114 and configured by the compiler and optimizer 114 to be the physical platform 120 meeting the specifications provided in, for example, the logical platform specification 108a shown in FIG. 1. These components may have been selected based on multiple factors, such as availability, specifications of these components, physical location, latency, and load factors. Also, the physical platform 120 includes the components as well as the links and switches connecting the components in 220.

Figure 3:
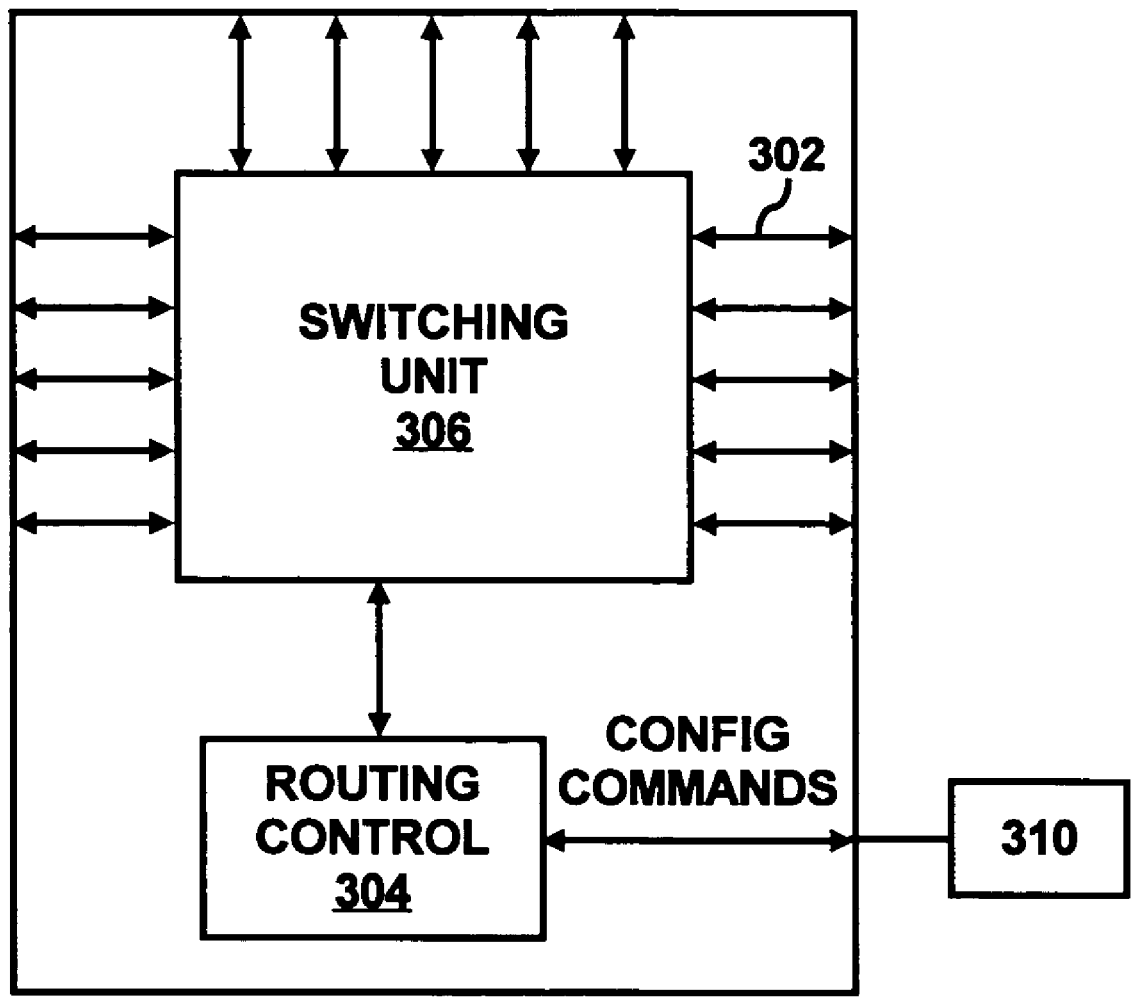
FIG. 3 shows a schematic diagram of a reconfigurable switch, according to an embodiment.

An example of one of the switches 202 within the reconfigurable data center 200 is shown in FIG. 3 as switch 202a. The switch 202a has a number of data ports 302 that connect through links 204, shown in FIG. 2, to other switches or to other components, such as processors, memory, or disks, in the reconfigurable data center 200. The number of ports 202 provided in each switch 202 may vary. Each switch 202 provides routing control that allows the switch to be programmed. In the reconfigurable data center 200, the routing control for the switches 202 is programmed through the console 310. The console 310 may be part of or connected to the compiler and optimizer 114 and the system installer 115 shown in FIG. 1. A collection of switches can be programmed by the console 310 to establish configurations that implement one or more physical platforms. Also, the console 310 may be connected to the components shown in FIG. 2 via the interconnection network including links and switches.

As shown in FIG. 3, the console 310 may transmit configuration commands to a routing control unit 304, which may include a controller and memory, for programming the switch 202a. In one example, the configuration commands include table entries for routing tables and address conversion tables. Programming the routing and address conversion tables is described in detail in U.S. patent application Ser. No. 10/892, 305, incorporated by reference above. In that application, the console 310 includes a table population unit programming the address conversion tables. Based on the physical platform deployed by the compiler and optimizer 114, different components may be configured to work together to provide a physical platform that meets the specification of a user. For example, one or more memory modules may be assigned to one or more processors to implement a physical platform, which is generally a computer system. Using routing and address conversion tables (not shown) in the control unit 304, the switch 202a may route data requests from the processors to the associated memory modules for the platform. After a reconfiguration, the routing and address conversion tables are loaded with new entries to accommodate routing between new components configured to work together. A switching unit 306 is provided in the switch 202a to route data within the switch 202a to the proper port or to the routing control unit 304 for processing.

As described above, the switches 202 provide the means for communication between components, such as processors, memory, disks, other switches, etc., in the reconfigurable data center 200. The switches 200 may be programmed to accommodate reconfiguration of the components into different physical platforms. This programming may include programming the switches to provide for static and dynamic routing. For example, routing and address conversion tables may be updated to provide for routing along a static path between component, along one of a plurality of static paths, and/or along one or more dynamic paths between components. A path may include one or more links and switches. Virtual communication channels and virtual circuits, such as known in the art, may be used to provide static paths. The routing control unit 304 and the switching unit 306 may be configured to support virtual circuits, for example, by updating routing tables. Also, virtual circuits may support multicast and merge capabilities. For multicast, a message that arrives at a single port is forwarded to multiple ports to implement a broadcast like capability. The multicast message may be broadcast only over a subset of all ports. Merge capabilities occur when messages arriving from multiple input ports are sent to a single output port.

Figure 4:
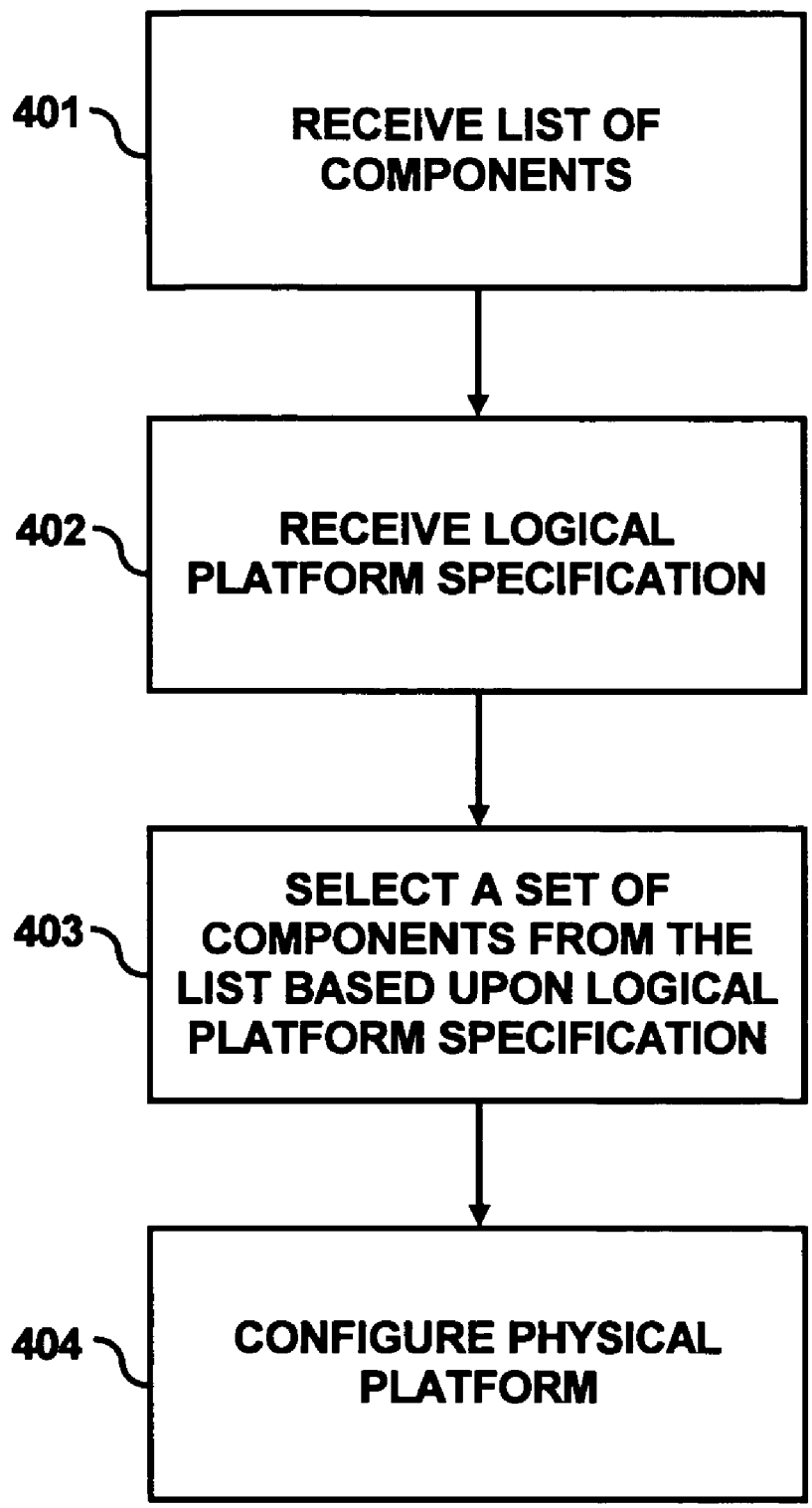
FIG. 4 shows a flow chart of a method configuring a physical platform, according to an embodiment.

FIG. 4 illustrates a method 400 for configuring a physical platform in a reconfigurable data center, according to an embodiment. The method 400 is described with respect to FIGS. 1-3 by way of example and not limitation. At step 401, the data center specification 106 is received by the compiler and optimizer 114. The data center specification 106 may include a description of all the components in the reconfigurable data center 200. Alternatively, the data center specification 106 describes only the components 101 that are available to be deployed as a physical platform. For example, some components may be committed to prior uses and thus are unavailable, or some components may be malfunctioning and thus are unavailable.

At step 402, the compiler and optimizer 114 receives a logical platform specification, which may include one of the logical platform specifications 108. The logical platform specification may include specifications for a computer system that meets the needs of a user. Examples of the specifications may include processor specifications, memory specifications, disk specifications, I/O device specifications, network specifications, etc.

At step 403, the compiler and optimizer 114 selects a set of components from the data center specification 106 that meet the specifications in the logical platform specification. For example, the logical platform specification may specify a processor used in a NUMA architecture having a 1 GHz processing speed. The compiler and optimizer selects a processor from the data center specification 106 that can be used in a NUMA architecture and having at least 1 GHz processing speed. Other factors, such as latency, physical location, etc., may be considered when selecting components, which are described in further detail with respect to the method 500 shown in FIG. 5.

At step 404, the compiler and optimizer deploys a physical platform, such as the physical platform 120, which meets the specifications in the logical platform specification and provides the functionality specified by the user. To deploy the physical platform 120, the compiler and optimizer 114 configures the components selected at step 403 to work together.

Configuring components my include provisioning memory for processors by populating address conversion tables, or assigning disks and other peripheral devices in the reconfigurable data center to the processors for the physical platform. Configuring may also include programming switches in the interconnection network to allow the components in the physical platform to communicate with each other.

Figure 5:
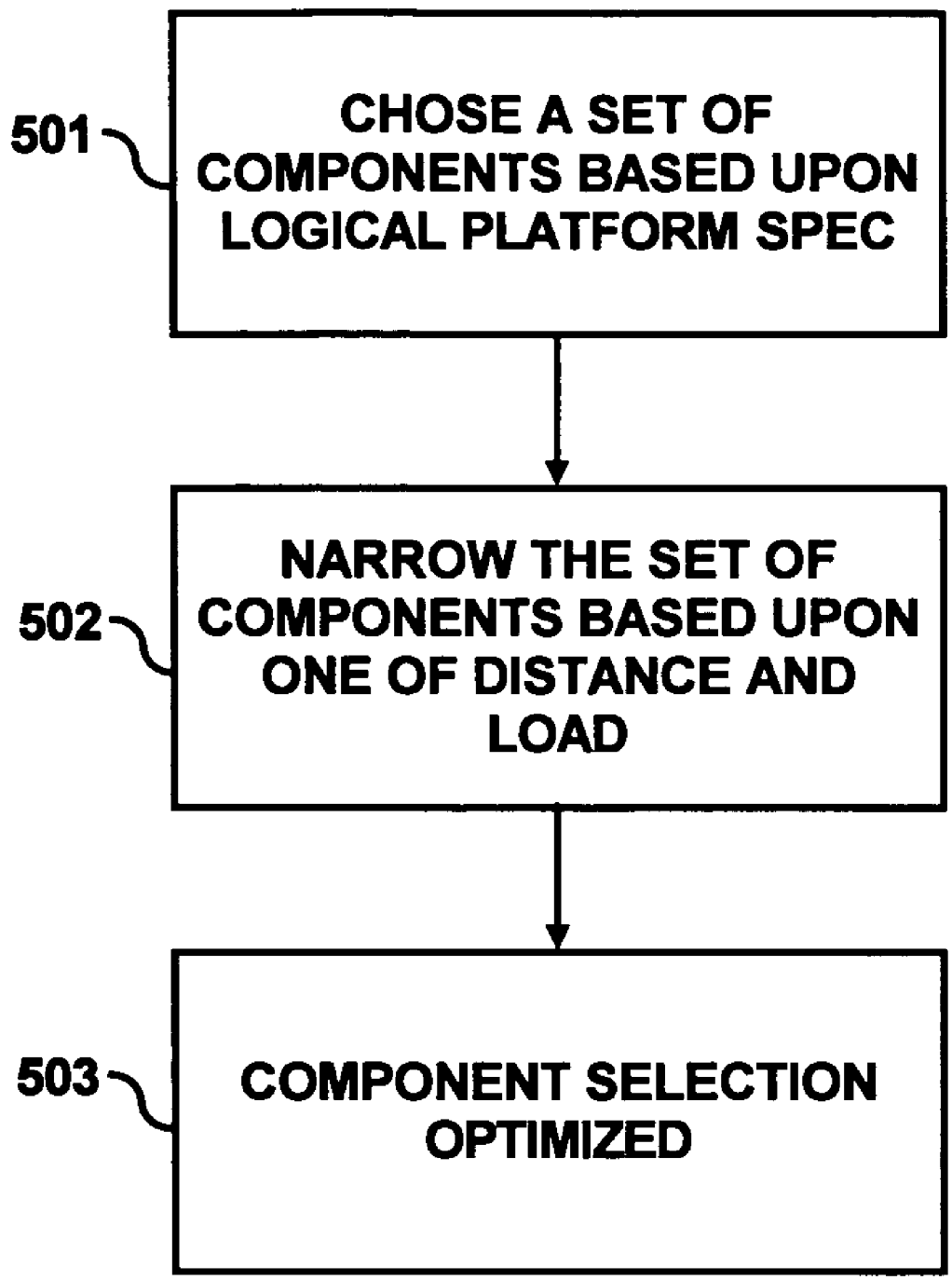
FIG. 5 shows a flow chart of a method for selecting components for the physical platform, according to an embodiment.

FIG. 5 illustrates a method 500 for selecting components from the data center specification 106, according to an embodiment. The steps of the method 500 may be performed as substeps of the step 403 of the method 400. The method 500 is described with respect to FIGS. 1-3 by way of example and not limitation. At step 501, the compiler and optimizer 114 selects a set of components from the data center specification 106 that meet the specifications in the logical platform specification.

At step 502, the set of components is narrowed based upon one or more factors, such as physical distance and load. Physical distance is related to communication latency between components. Generally, there is less latency for components that are closer together. For example, there may be a lesser number of switches between components physically close in proximity, which may result in shorter transmission times between components. Thus, if the logical platform specification includes a processor and a memory, the compiler and optimizer 114 attempts to select an available processor and memory physically close to one another.

Another factor that is considered at step 502 is load. For example, the compiler and optimizer 114 may select one or more of the switches 202 to be configured for the physical platform 120 shown in FIG. 1. The compiler and optimizer 114 may select one or more of the switches in close proximity to the other selected components and that have minimal load. The compiler and optimizer 114, for example, avoids switches having loads exceeding a predetermined threshold. Load may be considered when selecting other types of components, including processors, memory and disks.

At step 503, the narrowed set of components are optimized. For example, multiple physical platforms using the narrowed set of components are simulated and tested to determine whether the physical platform meets the user's needs. The metrics 112 shown in FIG. 1, such as processor performance, power, disk or memory access times, etc., are measured for each simulated physical platform and the most optimum physical platform is selected and deployed.

As described above, as part of the configuration process the compiler and optimizer 114 shown in FIG. 1 selects components from the components 101 to be configured as part of the physical platform 120. The selection process considers a variety of factors such as whether components satisfy the logical platform specifications. For example, the logical platform specification 108a includes hardware specifications and software specifications. These specifications are parsed into logical units. For example, processor specifications are broken down into logical processors, including the user requirements for one or more processors in the physical platform. Multiple logical processor units may be identified from a single logical platform specification, such as the logical platform specification 108a if this specification requires multiple processors, or if multiple logical platform specifications are submitted in a group then multiple logical processors may be identified from the group. The logical processors are mapped onto physical processors, such as one or more of the processors 102 shown in FIG. 1. Similarly, logical memory units are mapped to one or more of the memory modules 104 and logical disks are mapped to one or more of the disks 103 based on whether the physical hardware meets the user requirements of the logical units.

Figure 6:
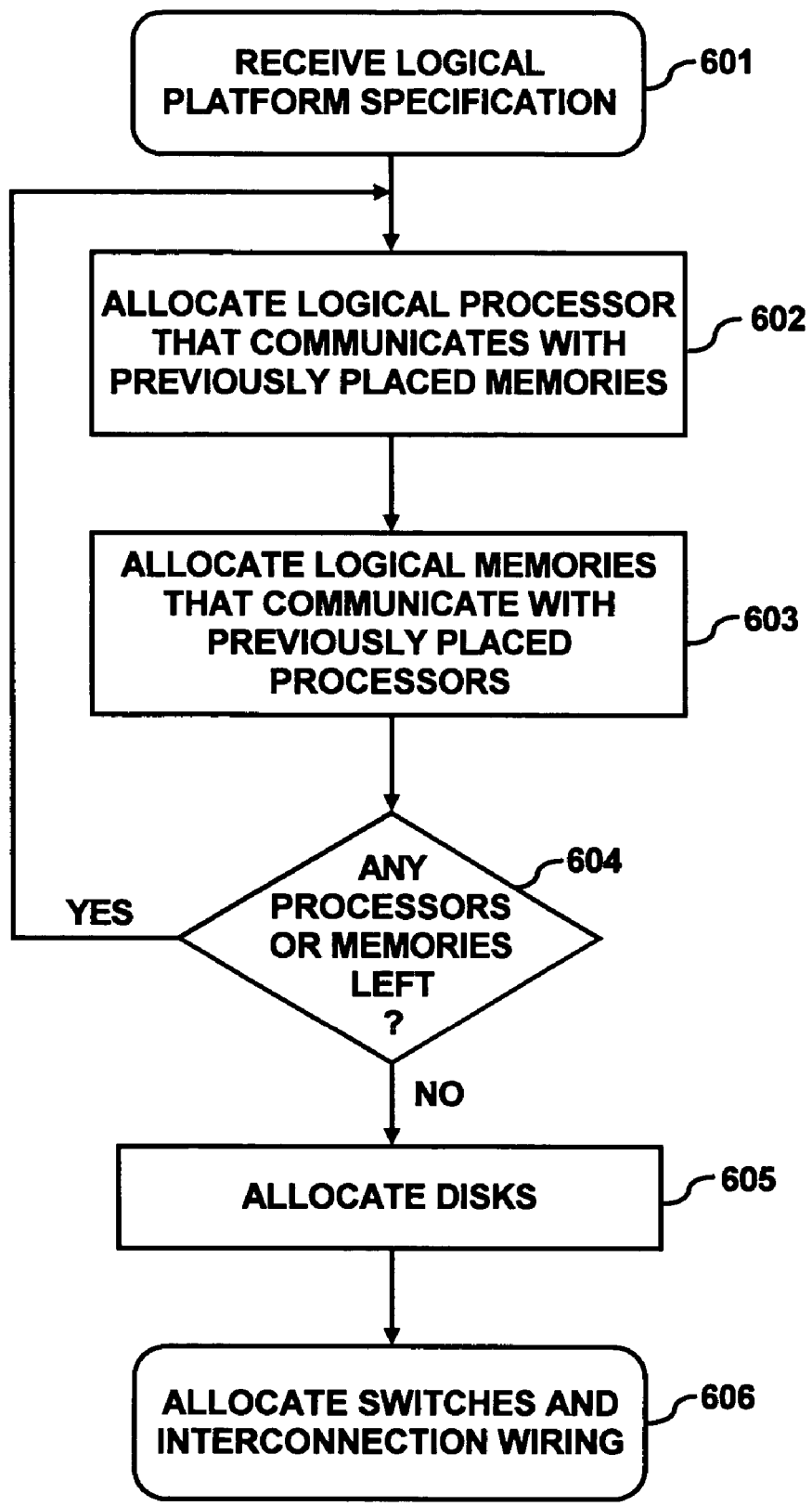
FIG. 6 shows a flow chart of a method for allocating components for the physical platform, according to an embodiment.

FIG. 6 illustrates a method 600 for mapping logical units to physical components, according to an embodiment. The steps of the method 600 may be performed as substeps in the selection step 403 and the configuration step 404 of the method 400. The method 600 is described with respect to FIGS. 1-3 by way of example and not limitation.

At step 601, one or more logical platform specifications are received, such as one or more of the logical platform specifications 108. In one example, the logical platform specification 108a is received and may include multiple logical processors. In another example, multiple logical platform specifications are received and may include multiple logical processors.

At step 602, the compiler and optimizer 114 determines whether any of the logical processors communicate with previously allocated memories. Initially, no memories are allocated, and a logical processor may be randomly selected or selected by some other means. However, if memories are already allocated, a logical processor is selected that communicates with those memories.

For example, the logical platform specification 108a specifies multiple shared-memory logical processors. If the logical processor being evaluated is a shared-memory logical processor that communicates with previously allocated physical processors via a shared memory, then memories that communicate with those processors may already be placed and the logical processor will be placed close to those memories and those processors. That is a processor physically close to the previously allocated processors and memories may be selected for the logical processor. Thus, there may be a greater opportunity to identify a physical processor close to the previously allocated physical processor that meets the user requirements set forth in the logical platform specification.

At step 603, memory is allocated that is referenced by previously placed logical processors. In one embodiment, a logical processor is allocated and then the memories that are referenced by that logical processor are allocated to increase the chances of finding physical processors and memory in close proximity that can be allocated to the logical processors and associated logical memory.

At step 604, a test is performed to determine whether any logical processors or logical memories remain to be allocated. If any logical processors or memories remain, then steps 602 and 603 are repeated until all logical processors and memories have been allocated.

In this fashion, memory may be allocated for each processor. For example, a first logical processor is allocated to a physical processor and then the memory associated with that logical processor is allocated. Then, the next logical processor is allocated and memory for that logical processor is allocated. The order of allocating logical processors may be based on load.

Communication between processors may not be limited to communication via shared memory and may include any form of communication between the processors directly or through other components, such as through a memory module or a disk. If communication is through a component, such as a memory module or disk, then the compiler and optimizer 114 attempts to allocate, for example, the memory module or disk, close to the processors communicating with the memory module or disk.

At step 602, if multiple logical processors communicate, then these processors may each be allocated to a physical processor based on load, also referred to as utilization. For example, a most heavily utilized shared-memory logical processor is allocated first and then the next most heavily utilized shared-memory logical processor is allocated. Utilization may be determined based on processor utilization metrics specified in the logical platform specification. To determine utilization, in addition to tasks to be performed by a logical processor, the logical platform specification may identify millions of instruction per second required by a task, bandwidth, etc. Thus, from the logical platform specification, the compiler and optimizer 114 may generate an analysis of the task loading on the logical processor and task loading for communication. This analysis is used to allocate physical processors to logical processors.

At step 605 disks are allocated to the logical processors. Disks, like the memory at step 603, may be allocated in a bundle. For example, a logical processor, memory and disk(s) associated with the logical processor are allocated. Then, a next bundle is allocated. Also, the compiler and optimizer 114 attempts to allocate a disk in close proximity to an associated processor that generates significant amount of workload for the disk, e.g., measured by number of anticipated disk accesses.

At step 606, after the logical units are placed, i.e., allocated to physical units in the reconfigurable data center, routing is determined. That is the switches 202 and the links 204 shown in FIG. 2 are allocated to components for a physical platform. A portion of a switch, e.g., one or more ports, instead of an entire switch may be allocated for a physical platform. Also, the switches may be programmed to provide static or dynamic switching based on the logical platform specifications. Static switching may include providing a static path between components, and dynamic switching may include providing one of multiple possible paths between components.

The steps for the methods 400-600 may be contained as a utility, program, subprogram, in any desired computer accessible medium. The steps may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

What has been described and illustrated herein are the embodiments along with some of its variations. The terms, descriptions and figures used herein are set forth by way of illustration only and are not meant as limitations. Those skilled in the art will recognize that many variations are possible within the spirit and scope of the embodiments, which intended to be defined by the following claims and their equivalents in which all terms are meant in their broadest reasonable sense unless otherwise indicated.

What is claimed is:

1. A method of selecting components for a physical platform in a reconfigurable data center, the method comprising:
   receiving a description of components in the reconfigurable data center at a configuration system, wherein the components are to be connected in the reconfigurable data center via a flexible interconnection network supporting varying types of communication traffic including memory accesses and disk accesses, and switches in the interconnection network are programmable to accommodate reconfiguration of physical platforms;
   receiving a logical platform specification describing the physical platform at the configuration system;
   selecting a set of components to be used for the physical platform from the description of components based on the logical platform specification and using the configuration system, wherein the set of components includes at least one processor, at least one disk, and at least one memory module meeting the logical platform specification; and
   programming the switches in the interconnection network to connect the selected at least one processor, at least one disk, and at least one memory module via interconnections in the interconnection network such that the at least one processor, at least one disk, and at least one memory module communicate with each other via the interconnection network to function as the physical platform.

2. The method of claim 1, wherein receiving a description of components in the reconfigurable data center comprises receiving a description of available components in the reconfigurable data center.

3. The method of claim 1, wherein selecting the set of components further comprises determining whether a component in the description of components meets the specifications for the component provided in the logical platform specification.

4. The method of claim 3, wherein the specifications for the component is associated with at least one of processor speed, processor type, memory speed, memory size, memory type, disk size, information associated with a switch, and information associated with wiring.

5. The method of claim 1, wherein selecting a set of components further comprises selecting interconnections in the interconnection network meeting minimum standards provided in the logical platform specification.

6. The method of claim 1, wherein selecting a set of components further comprises selecting the set of components based upon at least one of nearest physical location and load.

7. The method of claim 1, wherein selecting a set of components further comprises selecting the set of components interconnected with lowest latency interconnections.

8. The method of claim 1, wherein receiving a logical platform specification further comprises receiving the logical platform specification describing hardware specifications.

9. The method of claim 1, wherein receiving a logical platform specification further comprises receiving the logical platform specification describing software specifications.

10. The method of claim 9, wherein the software specifications are associated with at least one of an operating system, applications, BIOS, and an application signature.

11. The method of claim 1, further comprising configuring at least two components of the set of components as the physical platform using the configuration system.

12. The method of claim 1, further comprising:
    identifying a logical processor from the logical platform specification; and allocating the logical processor to the at least one processor in the reconfigurable data center based on at least one of whether the logical processor is to communicate with a processor previously allocated and the load of the logical processor.

13. A reconfiguration data center comprising:
means for receiving a description of components available in the reconfigurable data center, wherein the components are to be connected in the reconfigurable data center via a flexible interconnection network supporting varying types of communication traffic including memory accesses and disk accesses, and switches in the interconnection network are programmable to accommodate reconfiguration of physical platforms;
means for receiving a logical platforms specification;
means for selecting a set of components for a physical platform from the description of components based on the logical platform specification, wherein the set of components includes at least one processor, at least one disk, and at least one memory module meeting the logical platform specification; and
means for programming the switches in the interconnection network to connect the selected at least one processor, at least one disk, and at least one memory module via interconnections in the interconnection network such that the at least one processor, at least one disk, and at least one memory module communicate with each other via the interconnection network to function as the physical platform.

14. The reconfigurable data center of claim 13, further comprising means for determining whether a component in the description of components meets specifications provided in the logical platform specification.

15. The reconfigurable data center of claim 13, further comprising means for allocating components in the description of components to the physical platform based on distance between the components.

16. The reconfigurable data center of claim 13, further comprising means for allocating components in the description of components to the physical platform based on load of the components.

17. The reconfigurable data center of claim 13, further comprising means for configuring the physical platform from the set of components.

18. A computer readable storage medium on which is embedded one or more computer programs, said one or more computer programs implementing a method for configuring a reconfigurable data center, said one or more computer programs comprising a set of instructions of:
receiving a description of components and switches available in the reconfigurable data center, wherein the components are to be connected in the reconfigurable data center via a flexible interconnection network supporting varying types of communication traffic including memory accesses and disk accesses, and the switches in the interconnection network are programmable to accommodate reconfiguration of physical platforms;
receiving a logical platform specification describing a physical platform; and
selecting a set of components and switches from the description based on the logical platform specification, wherein the set of components includes at least one processor, at least one disk, and at least one memory module meeting the logical platform specification and operable to be connected via the switches in an interconnection network in the reconfigurable data center; and
programming the switches in the interconnection network to connect the selected at least one processor, at least one disk, and at least one memory module via interconnections in the interconnection network such that the at least one processor, at least one disk, and at least one memory module communicate with each other via the interconnection network to function as the physical platform.

19. The computer readable medium according to claim 18, wherein the one or more computer programs further comprises a set of instructions selecting the set of components based on specifications in the logical platform specification.

20. The computer readable medium according to claim 18, wherein the one or more computer programs further comprises a set of instructions narrowing the set of components based upon distances between components.

21. The computer readable medium according to claim 18, wherein the one or more computer programs further comprises a set of instructions narrowing the set of components based upon the number of switches between components.

22. The computer readable medium according to claim 18, wherein the one or more computer programs further comprises a set of instructions narrowing the set of components based upon the communication speed of switches between components.

23. The computer readable medium according to claim 18, wherein the one or more computer programs further comprises a set of instructions narrowing the set of components based upon the anticipated load of components.

24. The computer readable medium according to claim 18, wherein the one or more computer programs further comprises a set of instructions of configuring the physical platform from at least some of the components and switches in the set.

25. A reconfigurable data center comprising:
a plurality of components and a flexible interconnection network supporting varying types of communication traffic including memory accesses and disk accesses, and switches in the interconnection network are to be programmed to accommodate reconfiguration of physical platforms;
a configuration system to receive a logical platform specification and configure a physical platform from at least some of the plurality of components that meet the component specifications in the logical platform specifications,
wherein the at least some of the plurality of components includes at least one processor, at least one disk, and at least one memory module meeting the component specifications in the logical platform specifications; and
the configuration system programs the switches in the interconnection network to connect the at least one processor, at least one disk, and at least one memory module via interconnections in the interconnection network such that the at least one processor, at least one disk, and at least one memory module communicate with each other via the interconnection network to function as the physical platform.

26. The reconfigurable data center of claim 24, wherein the plurality of components comprise processors, disks, and memory modules.

27. The reconfigurable data center of claim 24, wherein the configuration system is further operable to select the at least some of the plurality of components from the plurality of components based on at least one of physical distance between selected components and load on components.

28. A method of allocating logical units to physical components in a reconfigurable data center, the method comprising:

receiving at least one logical platform specification including a description of components;

identifying a logical processor from the at least one logical platform specification; and allocating the logical processor to a processor in the reconfigurable data center based on at least whether the processor is to communicate with a processor previously allocated and based on a physical distance between the processor and the previously allocated processor.

29. The method of claim 28, further comprising:

allocating a memory module to the processor based on the logical platform specification.

30. The method of claim 29, wherein allocating a memory module further comprises:

allocating the memory module to the processor based on a physical distance between the processor and the memory module and a frequency of usage of the memory module.

31. The method of claim 30, further comprising:

allocating a disk to the processor based on the logical platform specification.

32. The method of claim 31, wherein allocating a disk further comprises:

allocating the disk to the processor based on a physical distance between the processor and the memory disk and a frequency of usage of the disk.

33. The method of claim 32, further comprising:

allocating at least a portion of a switch to a physical platform including the processor, the memory module, and the disk based on the logical platform specification.

* * * * *

UNITED STATES PATENT AND TRADEMARK OFFICE
CERTIFICATE OF CORRECTION

PATENT NO. : 7,421,575 B2  Page 1 of 1
APPLICATION NO. : 10/892272
DATED : September 2, 2008
INVENTOR(S) : Boon Seong Ang et al.

It is certified that error appears in the above-identified patent and that said Letters Patent is hereby corrected as shown below:

In column 7, line 19, delete "FIG. us" and insert -- Figure 1 is --, therefor.

In column 13, line 6, in Claim 13, delete "A reconfiguration" and insert -- A reconfigurable --, therefor.

In column 13, line 15, in Claim 13, delete "platforms" and insert -- platform --, therefor.

In column 14, lines 46-47, in Claim 25, delete "specifications," and insert -- specification, --, therefor.

In column 14, line 51, in Claim 25, delete "specifications;" and insert -- specification; --, therefor.

In column 14, line 60, in Claim 26, delete "claim 24," and insert -- claim 25, --, therefor.

In column 14, line 63, in Claim 27, delete "claim 24," and insert -- claim 25, --, therefor.

Signed and Sealed this

Twentieth Day of January, 2009

JON W. DUDAS
*Director of the United States Patent and Trademark Office*